H. BLUMENBERG, Jr.
PROCESS OF MAKING A FERTILIZER.
APPLICATION FILED JAN. 22, 1917.
1,266,198.
Patented May 14, 1918.
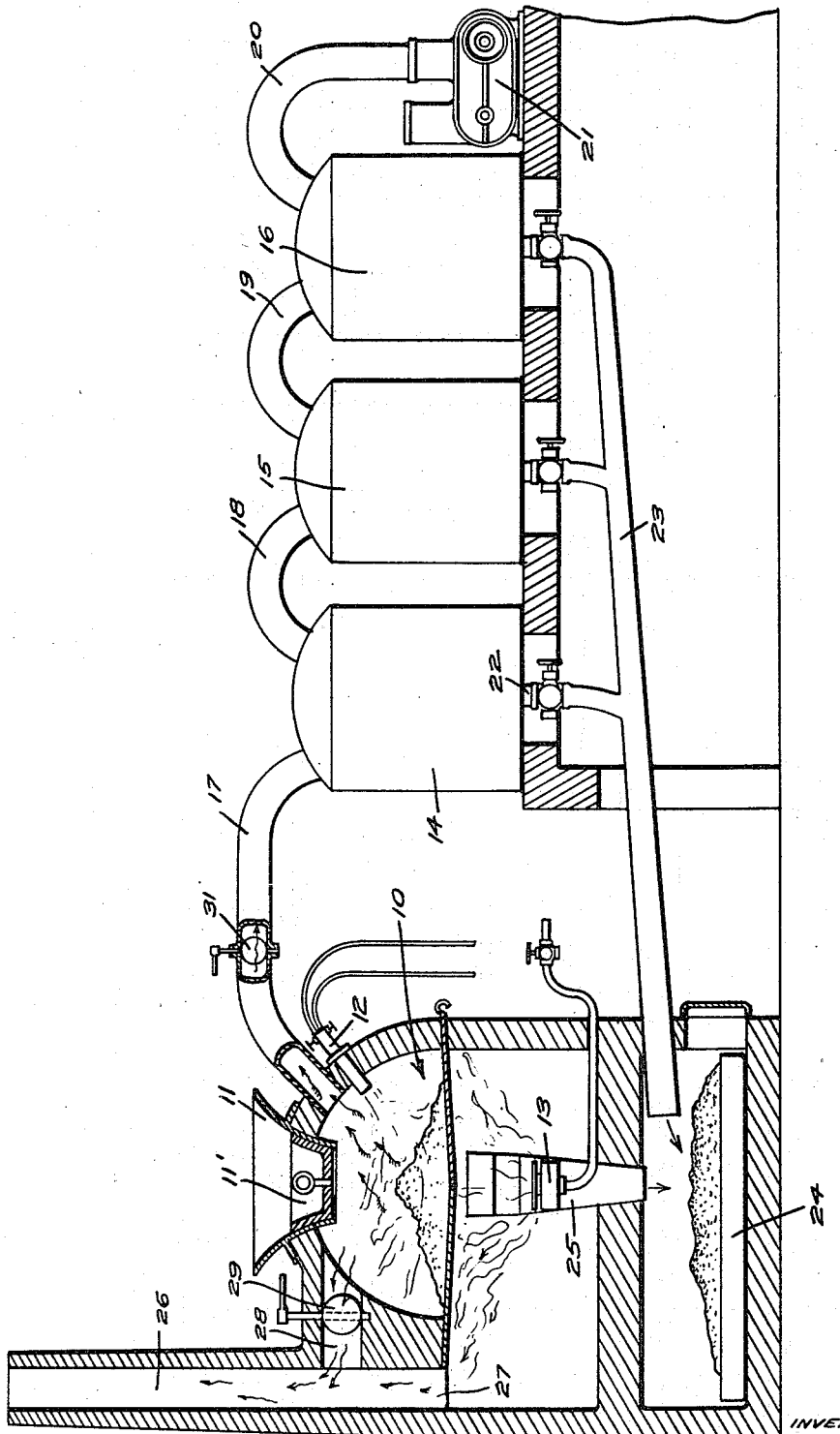
INVENTOR:
HENRY BLUMENBERG, JR.
BY

UNITED STATES PATENT OFFICE.

HENRY BLUMENBERG, JR., OF LOS ANGELES, CALIFORNIA, ASSIGNOR OF ONE-HALF TO FRIEDA BLUMENBERG, OF NEW YORK, N. Y., AND ONE-HALF TO JOHN J. SEEMAN, OF LOS ANGELES, CALIFORNIA.

PROCESS OF MAKING A FERTILIZER.

1,266,198.     Specification of Letters Patent.     Patented May 14, 1918.

Application filed January 22, 1917. Serial No. 143,798.

*To all whom it may concern:*

Be it known that I, HENRY BLUMENBERG, Jr., a citizen of the United States, residing at Los Angeles, in the county of Los Angeles and State of California, have invented new and useful Improvements in Processes of Making a Fertilizer, of which the following is a specification.

My invention relates to a process of making fertilizer.

It is an object of this invention to produce a fertilizer which contains a large percentage of available plant food in such proportions as to supply the necessary elements required by the plant.

It is another object of this invention to utilize by-products having little or no commercial value at the present time, in the production of a fertilizer containing 10% to 20% available phosphoric acid, 4% to 7% potassium sulfate, and from 5% to 10% of available nitrogen. The process of making the fertilizer is carried on by means of simple and inexpensive apparatus, and high temperatures and long periods of heating of the ingredients are avoided, thus saving time and expense of fuel, and wear and tear on the apparatus.

It is another object of this invention to produce a fertilizer in which aluminum sulfate, which, as well known, is toxic to plant life, is easily converted into aluminum nitrate and calcium sulfate, both of which are beneficial to plant life.

Other objects will appear hereinafter.

In the accompanying drawings which form a part of this specification, I have illustrated diagrammatically an apparatus suitable for carrying out my process:

10 designates a reduction furnace provided with a feed hopper 11 and having a closure valve 11′, a burner nozzle 12 projecting therein. A burner 13 is located below said furnace, and is adapted to heat the same to a moderate temperature. The bottom of the furnace is lined with magnesite brick laid in a burnt magnesite cement. 14, 15 and 16 are closed communicating condensation tanks, which, while shown three in number, may be of any desired number found economical in the operation of the apparatus. 17 is a conduit provided with a fire-brick damper 31 leading from the furnace to the first condensation tank 14. 18 and 19 are pipes connecting the condensation tanks. 20 is an exhaust pipe leading from the last condensation tank 16 to a vacuum pump 21. Each of the condensation tanks is provided at the bottom with a valve-controlled outlet 22 leading to a collecting pipe 23, which leads to a reaction pan or tank 24. 25 is a valve-controlled chute leading from the furnace 10 to the pan 24. 26 designates a chimney. 27 is a vent pipe leading from the burner 13 to the chimney. 28 is a vent pipe leading from the furnace 10 to said chimney, said vent pipe 28 being provided with a damper 29.

In compounding my fertilizer I use the following ingredients in the proportions specified:

2000 lbs. of feldspar, such as orthoclase, ground to pass through an 80 mesh screen, is mixed with 2000 lbs. of sodium nitrate and is introduced into the furnace 10 through the hopper 11. Next, from 5000 lbs. to 6000 lbs. of acid sludge is added thereto. This acid sludge or acid tar, commonly so called, is an enormous by-product of the oil refineries on the Pacific coast, especially in southern California. This acid sludge is a mixture containing about 50% of sulfuric acid and 50% of hydro-carbons and hydro-carbon derivatives. In the majority of the oil works, the acid sludge is allowed to run to waste, as it has practically no market value at present. In the larger works, it is treated by special methods to extract the acid therefrom. The cost of installation of a plant for the recovery of the sulfuric acid from the acid sludge is so great that it is not economical for the smaller refineries to install them, and consequently this by-product is run to waste.

The sulfuric acid, reacting on the sodium nitrate, liberates the nitric acid, which passes through the open conduit 17 to the condensers 14, 15 and 16, where it is collected. After all the nitric acid has been liberated from the sodium nitrate, there is left in the mass acid sodium sulfate. Now conduit 17 is closed by means of damper 31, and the damper 29 in the vent 28 leading from the furnace to the chimney is opened and the burner nozzle 12 is operated, heating the mass to 800° to 1000°. The feldspar is reduced and the potassium therein is rendered available in the resulting aluminum potassium and sodium sulfates. The hydrocarbons and hydro-carbon derivatives in the mass are burned out and pass off through the chimney.

The nitric acid collected in the condensing chambers is conducted through the valved outlet pipes 22 and the collecting pipe 23 to the reaction pan 24, in which about 3000 lbs. of phosphate rock (calcium phosphate) has been introduced. The nitric acid collected will be in the neighborhood of 1500 lbs. The nitric acid will liberate the phosphoric acid of the phosphate rock and render the same available is the form of acid calcium phosphate, and produce in the same reaction nitrate of calcium.

The end product in the furnace resulting from the treatment of acid sludge, feldspar, and sodium nitrate, as described, is now run through the chute 25 into the pan 24 and thoroughly mixed with the treated phosphate rock. An important result is obtained by the mixing of these ingredients. The aluminum sulfate, one of the ingredients of the mass coming from the furnace, and which is so deadly to plant life, is converted by the reaction with the calcium nitrate into aluminum nitrate and calcium sulfate, both valuable fertilizer ingredients.

The only process known at present for eliminating the toxic qualities of aluminum sulfate in the potassium sodium alums is to heat the latter for a long period of time in order to drive off the excess sulfuric acid. Such a process requires considerable time and is expensive because of its requirement of fuel, and the wear and tear on the furnace used in the treatment.

It sometimes happens that the finished fertilizer in the pan 24 is too sticky to be ground and sacked. If this condition arises, pulverized calcium carbonate is added thereto until the mass is sufficiently granular and friable. It will be understood by those skilled in the art that the process may be modified and other raw materials may be substituted for those described without departing from the spirit of my invention as claimed. For instance, in place of the feldspar any mineral containing potassium may be used, and in place of sodium nitrate any nitrate of an alkali metal or alkaline earth metal which will react with aluminum sulfate under the conditions described and will form the corresponding sulfate of the alkali metal or alkaline earth metal may be substituted. Likewise carbonates of the alkali metals or alkaline earth metals may be used to react with aluminum sulfate to produce a sulfate of the alkali metal or alkaline earth metal.

It is always advisable, if it is thought that the fused mass in the furnace when mixed with the treated phosphate rock will not be of proper consistency, to add calcium carbonate to the mass in the furnace prior to its introduction to the treated phosphate rock. By so doing, I avoid the possibility of the acid calcium phosphate reverting to insoluble normal calcium phosphate.

It is thus seen that I have devised a process for producing a valuable fertilizer utilizing a practically valueless by-product in which all materials used remain in the end product and which by means of the few simple reactions avoids repeating the handling of the materials.

I claim:

1. A process of making a fertilizer, comprising mixing ground feldspar, sodium nitrate and acid sludge containing sulfuric acid, heating the mass to liberate nitric acid therefrom, further heating the mass to 800° to 1000° C. to fuse the same and produce aluminum, potassium, and sodium sulfates, and mixing the fused mass with calcium nitrate and soluble calcium phosphate to produce a fertilizer containing calcium sulfate, calcium nitrate, aluminum nitrate, potassium sodium sulfate, and soluble calcium phosphate.

2. A process of making a fertilizer, comprising mixing ground feldspar, sodium nitrate and acid sludge containing sulfuric acid, heating the mass to liberate the nitric acid therefrom and collecting the same, further heating the mass to a temperature sufficient to fuse the same and produce aluminum, potassium, and sodium sulfates, treating calcium phosphate with the nitric acid collected to form soluble calcium phosphate and calcium nitrate, and mixing the fused mass with said soluble calcium phosphate and calcium nitrate.

3. A process of making a fertilizer, comprising mixing a mineral containing potassium, a nitrate of an alkali forming metal and acid sludge containing sulfuric acid, heating the mass to liberate nitric acid therefrom and collecting the same, further heating the mass to a temperature sufficient to fuse the same and to produce potassium sulfate, and treating calcium phosphate with said nitric acid and mixing the fused mass with the treated calcium phosphate.

4. A process of making a fertilizer, comprising mixing ground orthoclase, sodium nitrate, and acid sludge containing sulfuric acid, heating the mass to liberate nitric acid therefrom and collecting the same, further heating the mass to a temperature sufficient to fuse the same and produce aluminum, potassium, and sodium sulfates, mixing ground calcium carbonate with said mass, treating phosphate rock with the nitric acid collected, and mixing said mass with said treated phosphate rock to produce a fertilizer.

In testimony whereof I have signed my name to this specification.

HENRY BLUMENBERG, Jr.